United States Patent
Ding et al.

(10) Patent No.: US 11,826,918 B2
(45) Date of Patent: Nov. 28, 2023

(54) SYSTEMS AND METHODS FOR CAMERA CALIBRATION WITH A FIDUCIAL OF UNKNOWN POSITION ON AN ARTICULATED ARM OF A PROGRAMMABLE MOTION DEVICE

(71) Applicant: Berkshire Grey Operating Company, Inc., Bedford, MA (US)

(72) Inventors: Yu Ding, Arlington, MA (US); Christopher Geyer, Arlington, MA (US); Luis Galup, Sudbury, MA (US); Jeffrey Kittredge, Lexington, MA (US); Thomas Koletschka, Cambridge, MA (US); Lakshman Kumar, Burlington, MA (US); Anjana Nellithimaru, Billerica, MA (US); Ryan O'Hern, Reading, MA (US); Jeremy Saslaw, Cambridge, MA (US)

(73) Assignee: Berkshire Grey Operating Company, Inc., Bedford, MA (US)

( * ) Notice: Subject to any disclaimer, the term of this patent is extended or adjusted under 35 U.S.C. 154(b) by 49 days.

(21) Appl. No.: 17/167,648

(22) Filed: Feb. 4, 2021

(65) Prior Publication Data

US 2021/0248781 A1 Aug. 12, 2021

Related U.S. Application Data

(60) Provisional application No. 62/970,803, filed on Feb. 6, 2020.

(51) Int. Cl.
*G06T 7/70* (2017.01)
*B25J 9/16* (2006.01)
(Continued)

(52) U.S. Cl.
CPC .......... *B25J 9/1697* (2013.01); *B25J 9/1692* (2013.01); *G06T 7/70* (2017.01); *G06T 7/80* (2017.01);
(Continued)

(58) Field of Classification Search
CPC ... G06T 7/80; G06T 7/70; G06T 2207/30208; G06V 10/10; B25J 9/1692; G05B 2219/37009
See application file for complete search history.

(56) References Cited

U.S. PATENT DOCUMENTS

| 6,167,607 B1 | 1/2001 | Pryor |
| 9,283,680 B2 | 3/2016 | Yasuda et al. |

(Continued)

FOREIGN PATENT DOCUMENTS

| CA | 2928645 A1 | 4/2015 |
| CA | 3029834 A1 | 1/2018 |

(Continued)

OTHER PUBLICATIONS

US 10,521,930 B1, 12/2019, Islam et al. (withdrawn)
(Continued)

*Primary Examiner* — Syed Haider
(74) *Attorney, Agent, or Firm* — Gesmer Updegrove LLP

(57) ABSTRACT

A system is disclosed for providing extrinsic calibration of a camera to a relative working environment of a programmable motion device that includes an end-effector. The system includes a fiducial located at or near the end-effector, at least one camera system for viewing the fiducial as the programmable motion device moves in at least three degrees of freedom, and for capturing a plurality of images containing the fiducial, and a calibration system for analyzing the plurality of images to determine a fiducial location with
(Continued)

respect to the camera to permit calibration of the camera with the programmable motion device.

28 Claims, 14 Drawing Sheets

(51) Int. Cl.
*G06T 7/80* (2017.01)
*G06V 10/25* (2022.01)
*G06V 10/147* (2022.01)

(52) U.S. Cl.
CPC ............ *G06V 10/147* (2022.01); *G06V 10/25* (2022.01); *G05B 2219/37009* (2013.01); *G06T 2207/30208* (2013.01)

(56) References Cited

U.S. PATENT DOCUMENTS

| | | | |
|---|---|---|---|
| 9,984,354 | B1 | 5/2018 | Chinoy et al. |
| 10,369,698 | B1 | 8/2019 | Islam et al. |
| 10,373,336 | B1 | 8/2019 | Islam et al. |
| 10,399,227 | B1 | 9/2019 | Islam et al. |
| 10,510,155 | B1 | 12/2019 | Islam et al. |
| 10,562,186 | B1 | 2/2020 | Islam et al. |
| 10,562,188 | B1 | 2/2020 | Diankov et al. |
| 10,562,189 | B1 | 2/2020 | Diankov et al. |
| 10,565,737 | B1 | 2/2020 | Islam et al. |
| 10,576,636 | B1 | 3/2020 | Islam et al. |
| 10,628,966 | B1 | 4/2020 | Islam et al. |
| 10,636,172 | B1 | 4/2020 | Islam et al. |
| 10,853,757 | B1 | 12/2020 | Hill et al. |
| 2009/0055024 | A1 | 2/2009 | Kay |
| 2010/0272347 | A1 | 10/2010 | Rodnick et al. |
| 2011/0280472 | A1* | 11/2011 | Wallack .................. G06T 7/80 901/14 |
| 2013/0343640 | A1 | 12/2013 | Buehler et al. |
| 2015/0224650 | A1 | 8/2015 | Xu et al. |
| 2016/0059417 | A1 | 3/2016 | Shirakyan et al. |
| 2016/0210510 | A1* | 7/2016 | Wait ..................... G06V 10/751 |
| 2016/0221762 | A1 | 8/2016 | Schroader |
| 2016/0227193 | A1* | 8/2016 | Osterwood ............. G01S 17/42 |
| 2016/0243704 | A1 | 8/2016 | Vakanski et al. |
| 2017/0252114 | A1* | 9/2017 | Crawford ........... A61B 17/7089 |
| 2018/0126547 | A1* | 5/2018 | Corkum ................. B25J 9/1664 |
| 2019/0015989 | A1 | 1/2019 | Inazumi et al. |
| 2019/0047152 | A1 | 2/2019 | Tonogai |
| 2020/0306975 | A1 | 10/2020 | Islam et al. |
| 2020/0306977 | A1 | 10/2020 | Islam et al. |
| 2020/0316780 | A1 | 10/2020 | Rostrup et al. |
| 2020/0324414 | A1 | 10/2020 | Islam et al. |
| 2020/0394810 | A1 | 12/2020 | Islam et al. |
| 2021/0012534 | A1 | 1/2021 | Islam et al. |
| 2021/0114222 | A1 | 4/2021 | Islam et al. |
| 2021/0122050 | A1 | 4/2021 | Islam et al. |
| 2021/0178583 | A1 | 6/2021 | Ye et al. |
| 2021/0241491 | A1 | 8/2021 | Islam et al. |
| 2021/0258478 | A1 | 8/2021 | Yu et al. |
| 2021/0312664 | A1 | 10/2021 | Islam et al. |
| 2021/0327082 | A1 | 10/2021 | Islam et al. |
| 2021/0347054 | A1 | 11/2021 | Saadat Dehghan et al. |
| 2022/0172399 | A1 | 6/2022 | Islam et al. |
| 2022/0281114 | A1 | 9/2022 | Moreira Rodrigues et al. |
| 2022/0314452 | A1 | 10/2022 | Islam et al. |

FOREIGN PATENT DOCUMENTS

| | | |
|---|---|---|
| CN | 102363354 A | 2/2012 |
| CN | 110238820 A | 9/2019 |
| CN | 110634164 A | 12/2019 |
| JP | 2006110705 A | 4/2006 |

OTHER PUBLICATIONS

Notification Concerning Transmittal of International Preliminary Report on Patentability and the International Preliminary Report on Patentability issued by the International Bureau of WIPO in related International Application No. PCT/US2021/016586 dated Aug. 18, 2022, 13 pages.

International Search Report and Written Opinion issued by the International Searching Authority (the European Patent Office) in related International Application No. PCT/US2021/016586 dated May 21, 2021, 16 pages.

Middelplaats L N M, Mechanical Engineering, Automatic Extrinsic Calibration and Workspace Mapping Algorithms to Shorten the Setup time of Camera-guided Industrial Robots, Master of Science Thesis for the degree of Master of Science in BioMechanical Engineering at Delft University of Technology, Jun. 11, 2014, pp. 1-144, XP055802468, retrieved from the Internet: URL:http://resolver.tudelft.nl/uuid:0e51ad3e-a-2384d27-b53e-d76788f0ad26 [retrieved on May 7, 2021] the whole document.

Communication pursuant to Rules 161(1) and 162 EPC issued by the European Patent Office in related European Patent Application No. 21707875.7 dated Sep. 13, 2022, 3 pages.

Cipolla et al., Visually Guided Grasping In unstructured Environments, Journal of Robotics and Autonomous Systems (Invited Paper) 19, No. 3-4, 1997, 20 pages.

\* cited by examiner

SYSTEMS AND METHODS FOR CAMERA CALIBRATION WITH A FIDUCIAL OF UNKNOWN POSITION ON AN ARTICULATED ARM OF A PROGRAMMABLE MOTION DEVICE

PRIORITY

The present application claims priority to U.S. Provisional Patent Application No. 62/970,803 filed Feb. 6, 2020, the disclosure of which is hereby incorporated by reference in its entirety.

BACKGROUND

The invention generally relates to machine vision calibration systems, and relates in particular to machine vision (e.g., camera) calibration systems that provide extrinsic calibration of cameras relative to the bases of articulated arms or programmable motion devices.

Extrinsic camera calibration refers to the determination of the coordinate frame of a camera relative to a system coordinate frame. By comparison, intrinsic camera calibration refers to the determination of the internal parameters of the camera's lens and imager, such as field of view, focal length, image center, and distortion parameters. In systems described herein it is assumed that the intrinsic parameters are known a priori.

In some calibration systems a planar calibration target is placed onto the robot's end-effector. The end-effector is then moved in the robot's environment. For example, with reference to FIG. 1, a robotic system 10 that includes an articulated arm 12 and an end-effector 14, as well as a perception system 16 for aiding in programming the articulated arm 12 in moving objects (e.g., within the robotic environment such as for example, into or out of a bin 18). The robotic system 10 is shown grasping a calibration target 20 within perception range of the perception unit 16. Using this system, the robotic system may calibrate the end-effector of the articulated arm with the perception system 16 and/or any other perception system 22 within the robotic environment. In some examples, the process involves viewing individual markers 24 on the calibration target 20 from a plurality of varied viewing positions and orientations. This may be time-consuming and may be labor intensive in certain applications. Further, in certain applications, some of the environmental features and possibly even robot attachments, need to be removed from the system prior to the calibration process in order to prevent the planar calibration target from colliding with any of these features or attachments.

There remains a need for an extrinsic camera calibration system that is efficient to perform and does not require significant changes to the robotic system and its environment.

SUMMARY

In accordance with an aspect, the invention provides a system for providing extrinsic calibration of a camera to a relative working environment of a programmable motion device that includes an end-effector. The system includes a fiducial located at or near the end-effector, at least one camera system for viewing the fiducial as the programmable motion device moves in at least three degrees of freedom, and for capturing a plurality of images containing the fiducial, and a calibration system for analyzing the plurality of images to determine a fiducial location with respect to the camera to permit calibration of the camera with the programmable motion device.

In accordance with another aspect, the invention provides a method for providing extrinsic calibration of a camera to a relative working environment of a programmable motion device that includes an end-effector. The method includes viewing with a camera system a fiducial located at or near the end-effector as the programmable motion device moves in at least three degrees of freedom, capturing a plurality of images containing the fiducial, and analyzing the plurality of images to determine a fiducial location with respect to the camera to permit calibration of the camera with the programmable motion device.

In accordance with a further aspect, the invention provides a method for providing extrinsic calibration of a camera to a relative working environment of a programmable motion device that includes an end-effector. The method incudes capturing a plurality of images containing a fiducial located at or near the end-effector as the programmable motion device, said capturing the plurality of images occurring while the programmable motion device moves in at least three degrees of freedom during the processing of objects with the programmable motion device, and analyzing the plurality of images to determine a fiducial location with respect to the camera to permit calibration of the camera with the programmable motion device during the processing of objects with the programmable motion device.

BRIEF DESCRIPTION OF THE DRAWINGS

The following description may be further understood with reference to the accompanying drawings in which.

The drawings are shown for illustrative purposes only.

DETAILED DESCRIPTION

In accordance with various aspects of the invention, a calibration system and method are provided that calibrate the extrinsic parameters of one or more cameras relative to the working environment of a robotic arm. The method estimates the extrinsic parameters (the coordinate frames) of one or more cameras relative to the robot's frame, and in certain aspects, benefits imaging cameras internally paired with depth sensors (structured light; stereo; or time-of-flight). The method also does not require significant changes to the robot, and does not require attachments to be removed. The system involves the use of a fiducial (marker) that may (or may not) be permanently mounted on the robot or end-effector.

Figure 1:
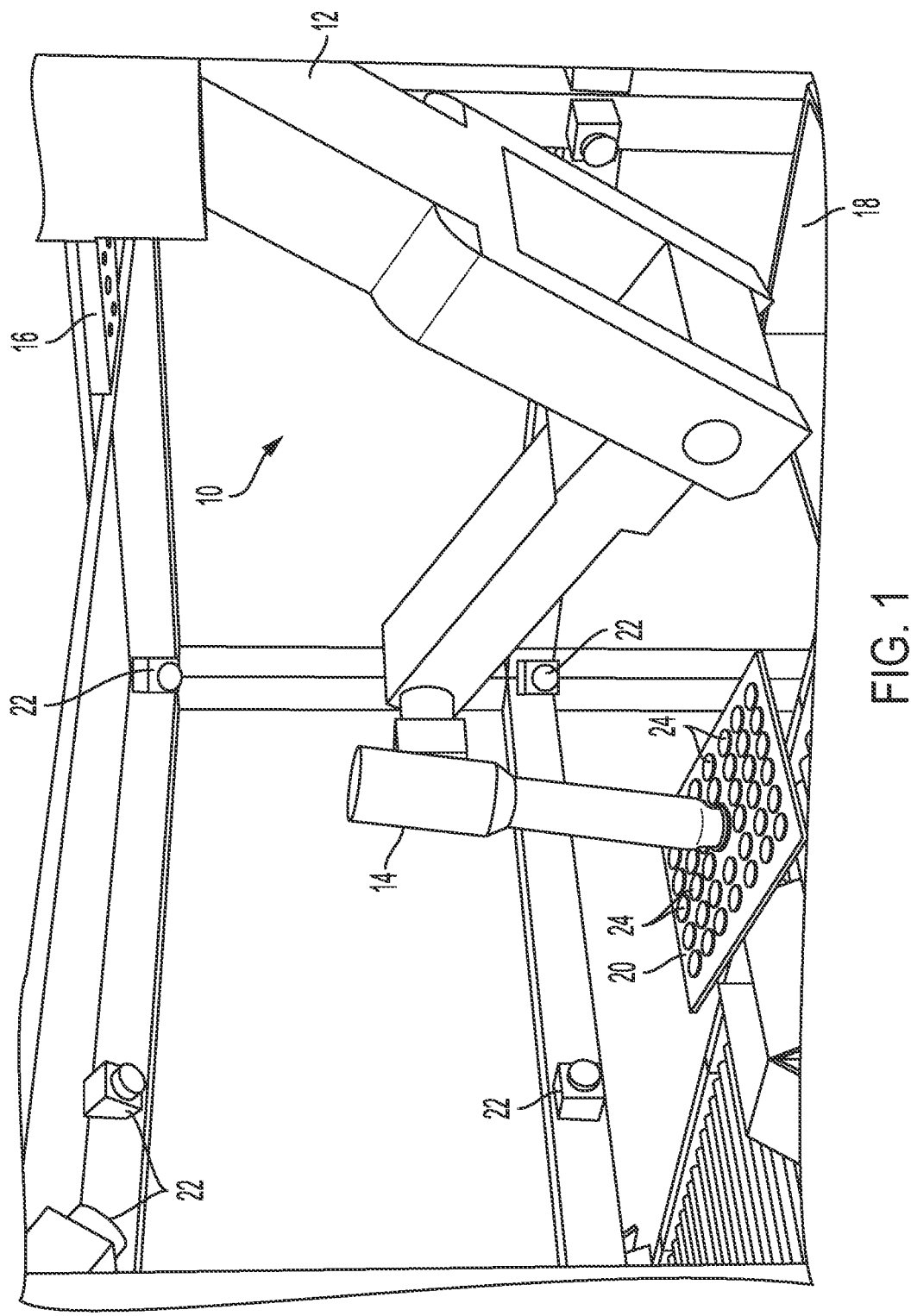
FIG. 1 shows an illustrative diagrammatic view of components of a system for providing camera calibration in a programmable motion system in accordance with the prior art.
Figure 2A:
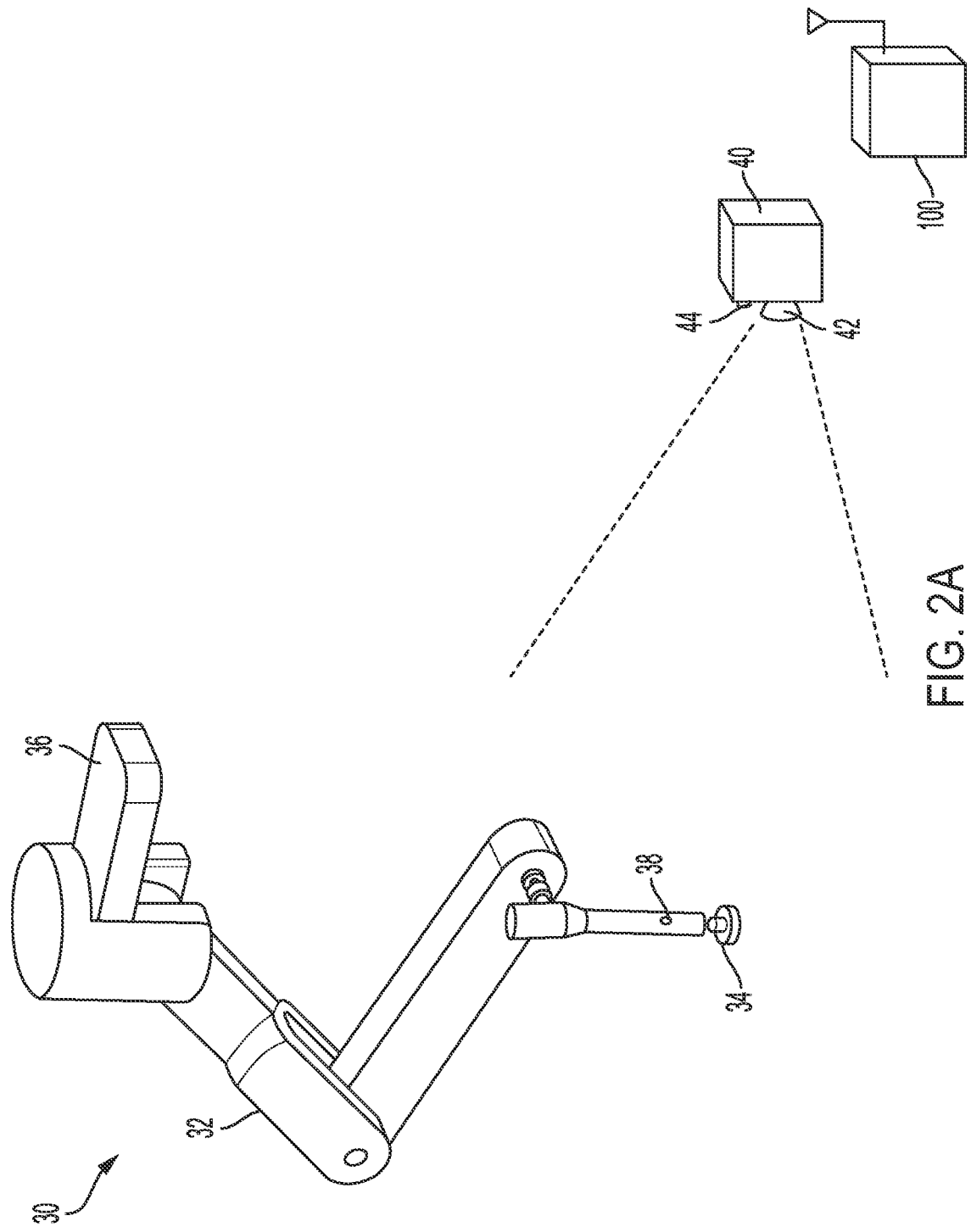
FIGS. 2A and 2B show illustrative diagrammatic views of a detection unit and a programmable motion device that includes a calibration feature in accordance with an aspect of the present invention, with the programmable motion device being in a first position (FIG. 2A) and a second position (FIG. 2B) wherein the calibration feature is in the same location with respect to the detection unit in each of the positions.

FIG. 2A shows a system 30 employing calibration systems in accordance with certain aspects of the present invention. The system 30 includes articulated arm 32 with an end-effector 34, as well as a perception system 36. The system further includes a single fiducial 38 on the articulated arm 32 on or near the end-effector 34 in accordance with certain aspects of the invention. The use of the single fiducial (at a time) permits the calibration process of certain aspects of the invention to uniquely calibrate the extrinsic parameters of one or more cameras with respect to the articulated arm. The fiducial 38 may be in the form of any of an LED or other small but bright illumination source (e.g., brighter than ambient illumination), or a reflective (e.g., retroreflective) marker, such as an at least semi-spherical retroreflective sphere. In accordance with other aspects, a plurality of fiducials may be used, with one or more being used at a time.

A detection unit 40 includes a camera 42 for detecting illumination from the fiducial 38. If using a retro-reflective ball as the fiducial 38, the ball is illuminated from an illumination source 44 co-located with the camera 42. The fiducial may be permanently attached to, or optionally removable from, the robot end-effector.

Figure 2B:
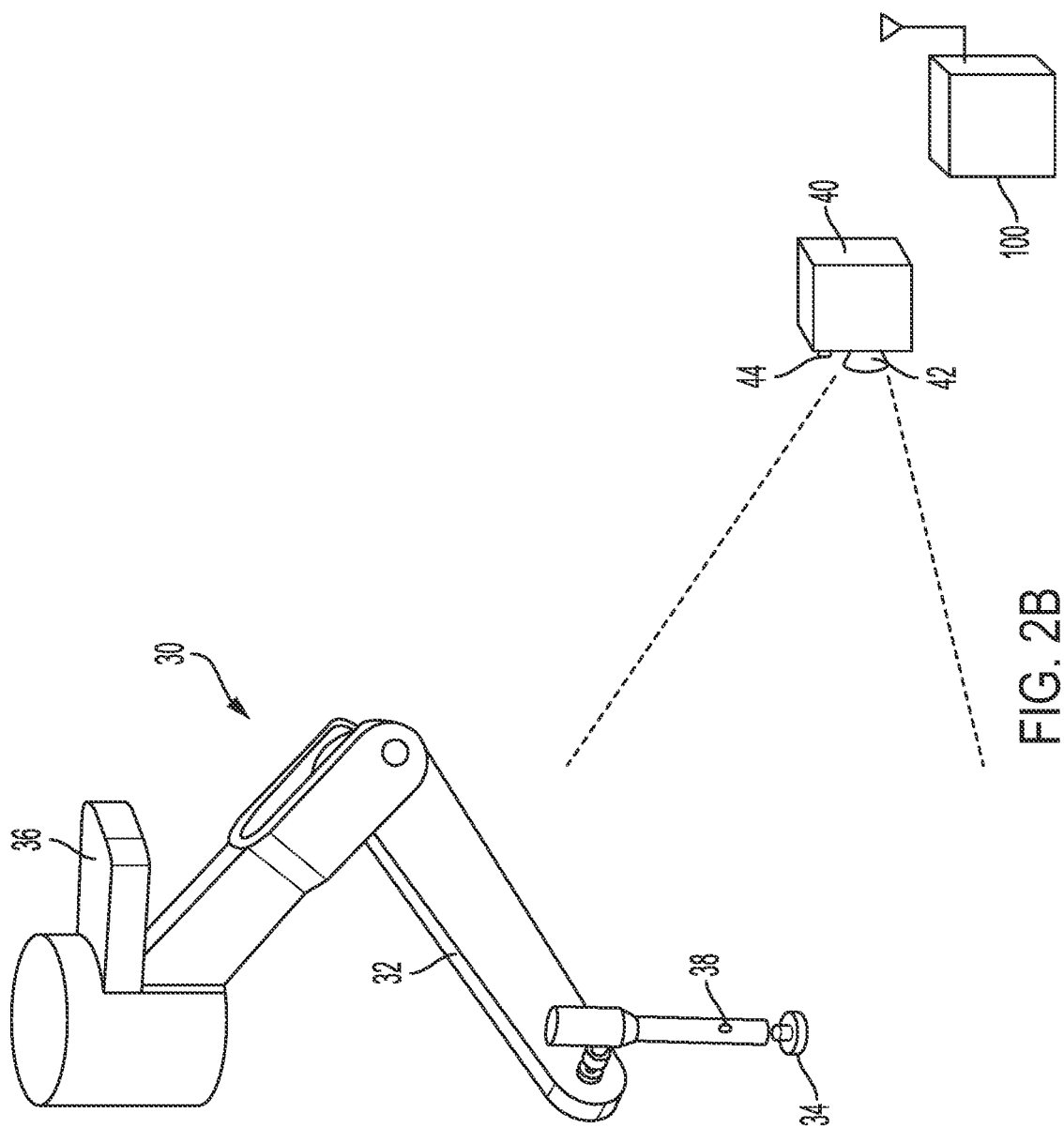

In accordance with certain aspects, the system provides calibration even when different positions of the articulated arm may result in a fiducial being located at the same location even when the articulated arm is in a very different position. FIG. 2B, for example, shows the articulated arm 32 in a very different position than that of FIG. 2A, yet the fiducial 38 (e.g., single fiducial) is in the same position relative the camera 42 of the detection unit 40. The fiducial 38 (e.g., retro-reflective ball or LED or other point-like light source) means that the image position of the fiducial is unambiguous. In other words, if there were two or more fiducials, logic would be required to determine which image point—pixel coordinates—belonged to which fiducial. One fiducial means there can be one and only one assignment. An important benefit of the technique is that the position of the fiducial need not be precisely localized. Its position can be completely unknown.

Figure 3:
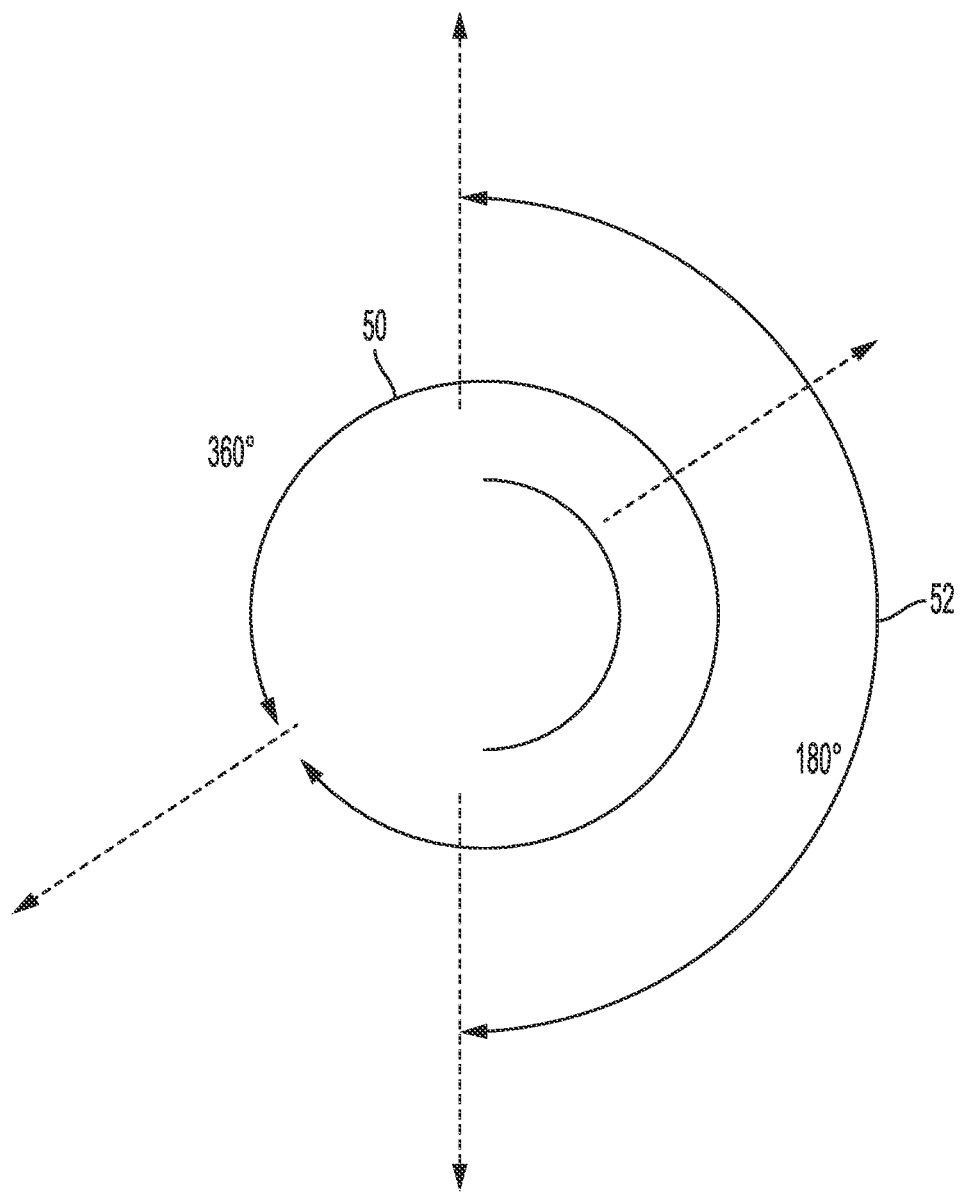
FIG. 3 shows an illustrative diagrammatic view of a multi-dimensional range of perception directions of a calibration feature in accordance an aspect of the present invention.

Again, the fiducial 38 may be either a retro-reflective ball, or an LED that is brighter than ambient lighting. Additionally, if there is significant background lighting, the LED may be imaged in both its on and off state, and then the difference between images can be used to detect LED position. In either case the LED or the retro-reflective ball is designed such that it is visible from nearly a full half-sphere of directions, i.e., 360 degrees×180 degrees illumination or reflective sphere as shown diagrammatically in FIG. 3. In particular, with the fiducial 38 positioned as shown, illumination is emitted in 360 degrees as shown at 50, and vertically 180 degrees as shown at 52.

Figure 4A:
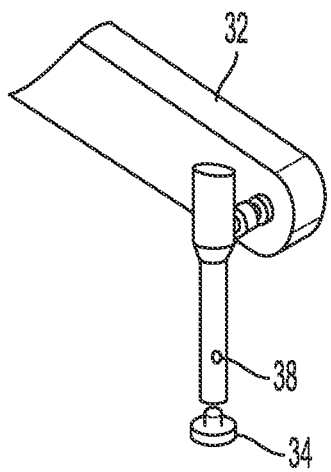
FIGS. 4A and 4B show illustrative diagrammatic views of an end-effector that includes a fiducial marker in accordance with an aspect of the present invention, with the end-effector in a first position (FIG. 4A) and a second position (FIG. 4B)
Figure 4B:
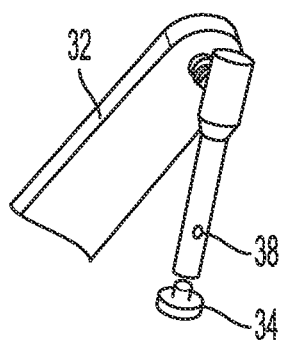
Figure 5A:
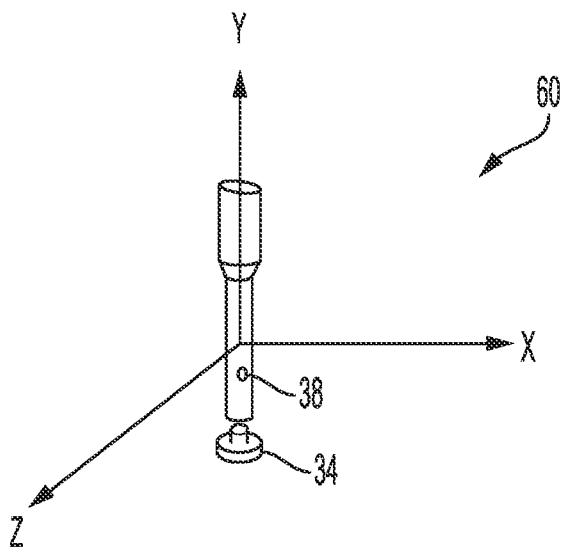
FIGS. 5A and 5B show illustrative diagrammatic views of an end-effector that includes a fiducial marker in a first non-moved position (FIG. 5A) and a second moved position in which the end-effector has been rotated with respect to any of three mutually orthogonal axes of rotation (FIG. 5B)
Figure 5B:
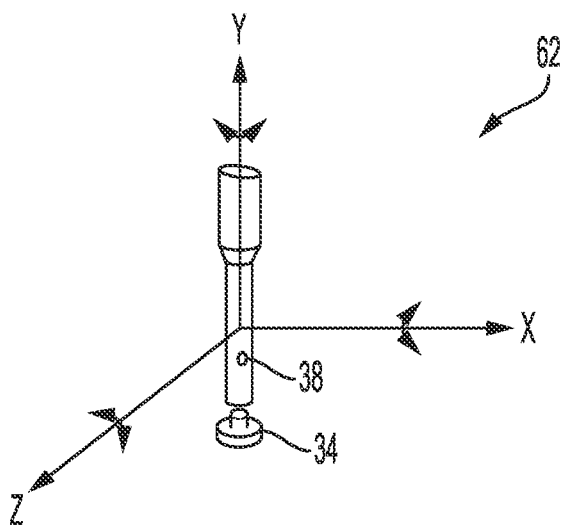

In accordance with an aspect of the invention, a portion of the articulated arm 32, such as, for example the end-effector, is rotated through each of three degrees of freedom, while images are recorded of the fiducial 38 and the forward kinematics of the end-effector are also recorded (i.e., the position and orientation of the end-effector in space) FIGS. 4A and 4B show the end-effector 34 with the associated fiducial 38 being moved from a first position (FIG. 4A) to a second position (FIG. 4B) such that the end-effector and fiducial move through at least three degrees of freedom of movement as shown diagrammatically in FIG. 5A (at 60 showing an initial position) and FIG. 5B (showing at 62 a later position having moved in x, y, and z dimensions). A plurality of images are captured during this movement.

The processes for automatically planning multiple joint configurations of the robot in order to present the fiducial to the one or more cameras, use the mechanical design (in which approximate extrinsic parameters may be known or given) to plan out the places where the LED is likely to be visible to the camera(s). These processes further compensate for known constraints for poses of the estimation algorithms. In particular, the estimation process requires that the robot not simply translate the fiducial between the views—they must be in general position. The robot must rotate the coordinate frame of the fiducial in order for the fiducial's position to be calculated. In addition, the rotation may not be solely around a single axis. For example, one instance may be: determine a cuboidal region of interest, choose a discretization, e.g., grid count $(N_x, N_y, N_z)$ for each of the three axes, as well as a number of different orientations with which to present the LED, e.g. $N_o=3$. This collection of poses would be over-representative of poses putting the fiducial in "general position." There is a balance between the number of poses (the more of which reduces the eventual estimation error) and the time it takes to the given number of poses.

Figure 6A:
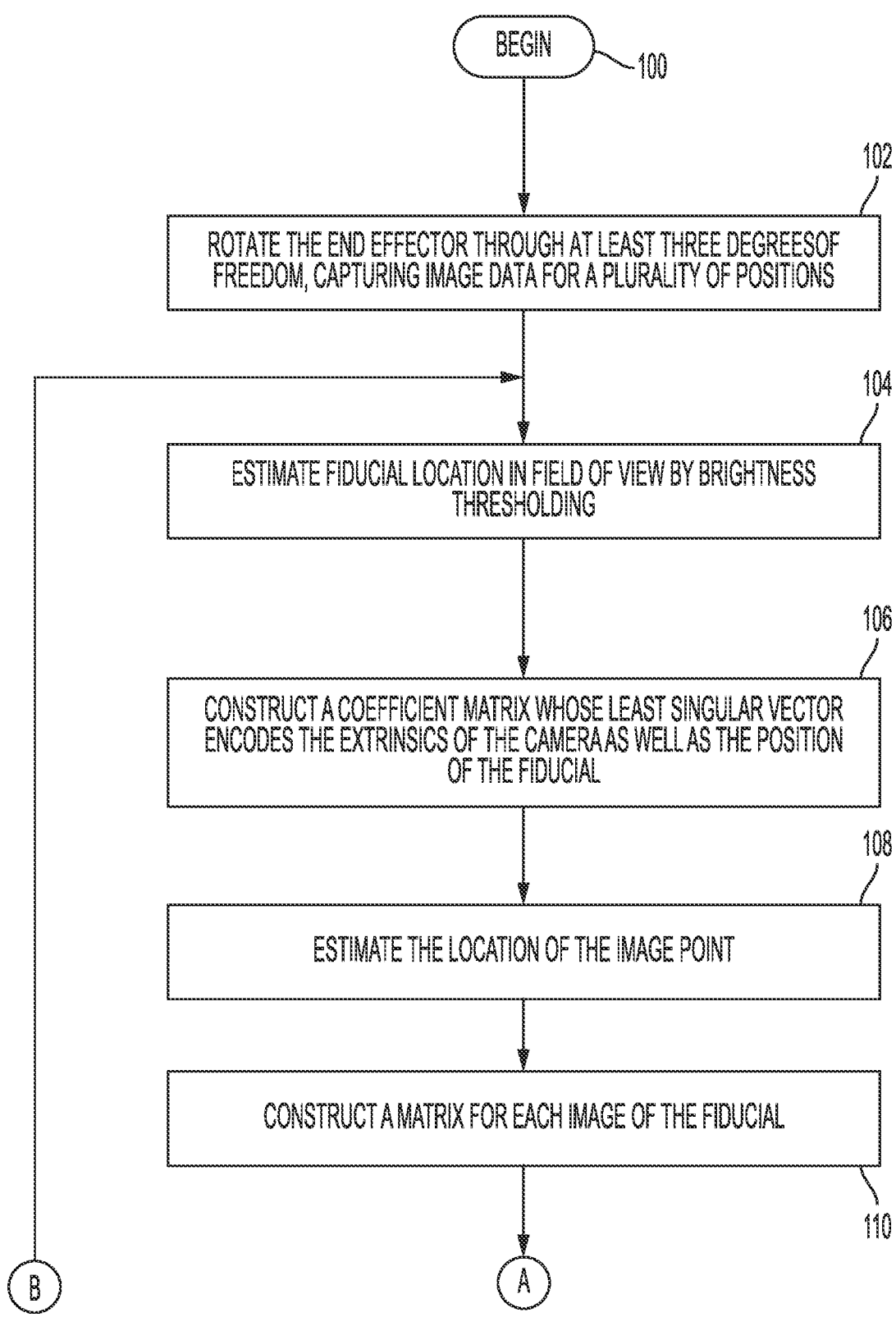
FIGS. 6A and 6B show illustrative diagrammatic views of a calibration process for use in a system in accordance with an aspect of the present invention.
Figure 6B:
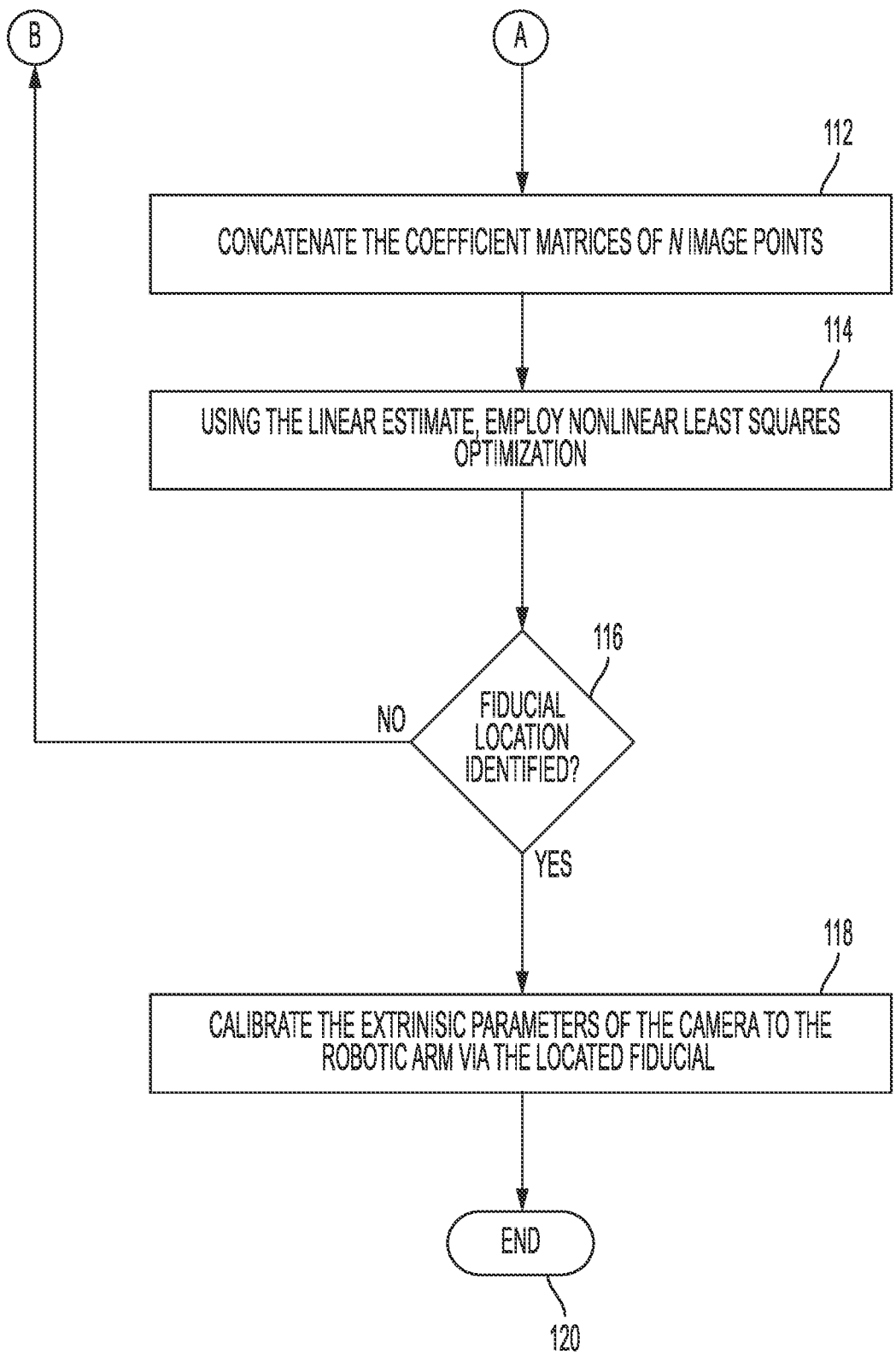

With reference to FIGS. 6A and 6B in accordance with an aspect of the invention, the calibration process begins (step 100), with first rotating the end-effector through at least three degrees of freedom as shown diagrammatically in FIG. 5B, and capturing image data for a plurality of positions during this rotation of the end-effector (step 102). The process next involves estimating the extrinsic parameters from the data by first estimating the position of the fiducial by thresholding each camera image, and then averaging the positions of the above-threshold (brightest) pixels (step 104). Or as described above, taking the difference of two images in which for example, the fiducial is a controlled LED that is turned on and off between images while the robot is stationary.

The process then obtains a linear estimate by constructing a coefficient matrix whose least singular vector encodes the extrinsics of the camera as well as the position of the fiducial (step 106). The equation for positioning of the image point is as follows in accordance with an aspect:

$$q_i = KPAF_i p \tag{1}$$

where the equation is homogeneous and therefore equality is up to scale, and further, where:

- $q_i$ is the image point in homogeneous coordinates, e.g. (u,v,1).
- K is the known camera projection matrix encoding the intrinsic parameters, typically (f,0,$c_x$; 0,f,$c_y$; 0,0,1).
- P is the known matrix (1,0,0,0; 0,1,0,0; 0,0,1,0).
- A is the unknown transformation from the robot's base to the camera, typically ($r_{11}$,$r_{12}$,$r_{13}$,$t_1$; $r_{21}$,$r_{22}$,$r_{23}$,$t_2$; $r_{31}$,$r_{32}$,$r_{33}$,$t_3$; 0,0,0,1) where the $r_{ij}$ form a rotation matrix.
- $F_i$ is the known transformation from the robot's end-effector to the robot's base, also known as the robot's forward kinematics. These forward kinematics are recorded from the robot at each position in which the fiducial is images by the camera(s).
- p represents the unknown coordinates of the fiducial in the end-effector's coordinate frame in homogeneous coordinates, i.e., ($p_1$,$p_2$,$p_3$,1).

The location of the image point is then estimated (step 108), and the process then involvers constructing a matrix for each image of the fiducial (step 110). The coefficient matrix is obtained in accordance with an aspect, by constructing a 3×39 matrix for each imaged fiducial. If the measured fiducial has position $\tilde{q}_i$, then the coefficient matrix are the 39 coefficients of the 39 polynomials:

$$p_1 r_{1,1}, p_1 r_{1,2}, p_1 r_{1,3}, p_1 r_{2,1}, p_1 r_{2,2}, p_1 r_{2,3}, p_1 r_{3,1}, p_1 r_{3,2}, p_1 r_{3,3}, p_2 r_{1,1}, p_2 r_{1,2}, p_2 r_{1,3},$$

$$p_2 r_{2,1}, p_2 r_{2,2}, p_2 r_{2,3}, p_2 r_{3,1}, p_2 r_{3,2}, p_2 r_{3,3}, p_3 r_{1,1}, p_3 r_{1,2}, p_3 r_{1,3}, p_3 r_{2,1}, p_3 r_{2,2},$$

$$p_3 r_{2,3}, p_3 r_{3,1}, p_3 r_{3,2}, p_3 r_{3,3}, r_{1,1}, r_{1,2}, r_{1,3}, r_{2,1}, r_{2,2}, r_{2,3}, r_{3,1}, r_{3,2}, r_{3,3}, t_1, t_2, t_3 \tag{2}$$

of the expression:

$$K^{-1} \tilde{q}_i \times PAF_i p \tag{3}$$

The process then involves concatenating the coefficient matrices for each of N image points to form a 3N×39 matrix (step 112), whose least singular vector without noise would have the form of the 39-dimensional vector above. Since noise will be present, and since it will have an arbitrary scaling, the first step is to determine the scale from the determinant of the coefficients corresponding to the rotation matrix. Having done so, the process then projects the estimated coefficients of the rotation matrix, projecting them to the manifold SO(3) of rotation matrices. Once an initial estimate of the rotation is made, a similar revised linear algorithm can be employed to estimate the unknown vectors t and p.

The system then uses the linear estimate, to employ nonlinear least squares optimization to refine the estimates of the extrinsics and the position of the fiducial (step 114). The process uses equation (1) as a model, and with the initial estimates uses a nonlinear least squares optimization, such as Levenberg-Marquardt, to minimize the sum of the square norms of the projected points to the measurements (in non-homogenous image coordinates). In addition, outliers in the process can be removed using, for example, random sample consensus, or other approaches robust to outliers. The extrinsic parameters of the camera are thereby calibrated to the robotic arm via the fiducial (step 118) and the process ends (step 120).

The robotic system may also employ multiple cameras. In this instance, each camera can at first be treated individually as described above, but then combined in a final optimization step that would be expected to have reduced error. From the optimization procedure for the individual cameras, the estimates of the position of the fiducial relative to the end-effector should be close, but not exactly equal. First, the mean of these positions is taken to be the initial estimate for the combined multi-camera estimation; and the initial estimates for the individual cameras' poses are taken to be the estimates of poses from the individual camera estimates. The final optimization sums the square errors (or other robust penalty function) for all the re-projection errors. The output of this procedure is the final estimate encoding the poses of all cameras in the multi-camera system.

In accordance with various aspects, therefore, the system and process provide automatic planning and processes for verifying the calibration method. Such calibration may further be done as a robotic system is processing objects, provided that the articulated arm moves in at least three degrees of freedom while the fiducial is visible to camera undergoing the calibration in accordance with an aspect of the invention. In this way, not only fixed cameras, but also movable cameras may readily be calibrated with the articulated arm.

Figure 7:
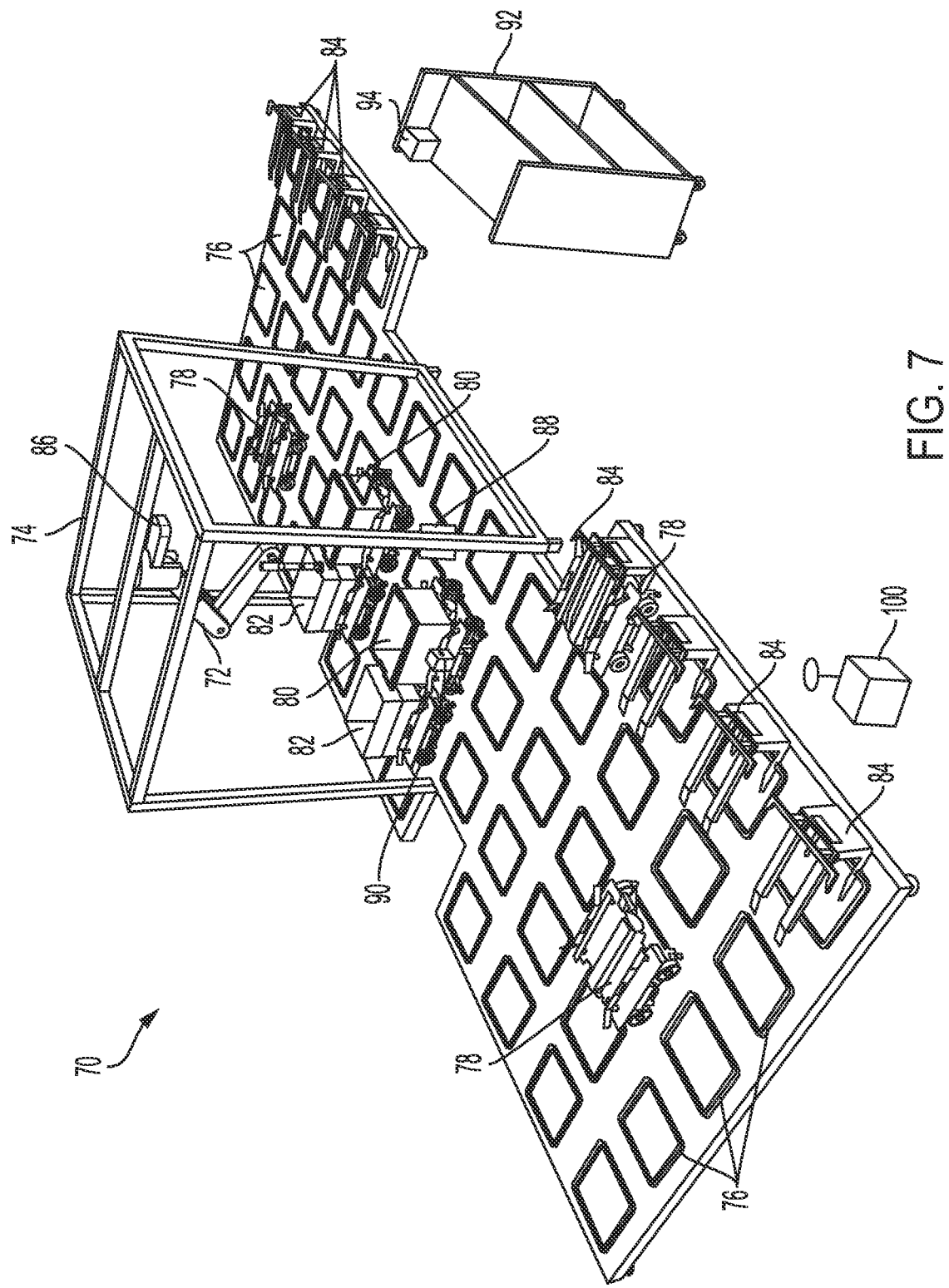
FIG. 7 shows an illustrative diagrammatic view of an object processing system employing a camera calibration system in accordance with an aspect of the present invention.

FIG. 7, for example, shows an object processing system 70 that includes a programmable motion device (e.g., an articulated arm 72 mounted on a frame 74). The articulated arm 72 is mounted above a portion of a discontinuous track system 76 on which carriers 78 are able to move in each of two mutually orthogonal directions by having the wheels on the carriers 79 pivot to either of two mutually perpendicular directions. The carriers 76 are adapted to receive any of supply bins 80 or destination bins 82. The carriers 76 are able to move the supply bins 80 and destination bins 82 near the articulated arm such that the articulated arm may be employed to move objects from a supply bin to a destination bin under the articulated arm. The system may also include shelves 84 onto which any of supply bins or destination bins may be temporarily parked. The programmable motion device may also include a perception unit 86 attached to the articulated arm 72, as well as one or more cameras 88 mounted to the frame 74. Additionally, the carriers 78 may include a camera 90. Further, the system may include one or more non-automated carriers (e.g., moving shelf unit 92) that human worker may move near to the programmable motion device. The non-automated carriers may also include a camera 94 mounted thereon. The system may be controlled by one or more computer processing systems 100 that communicate with all devices via wired or wireless communication.

Figure 8:
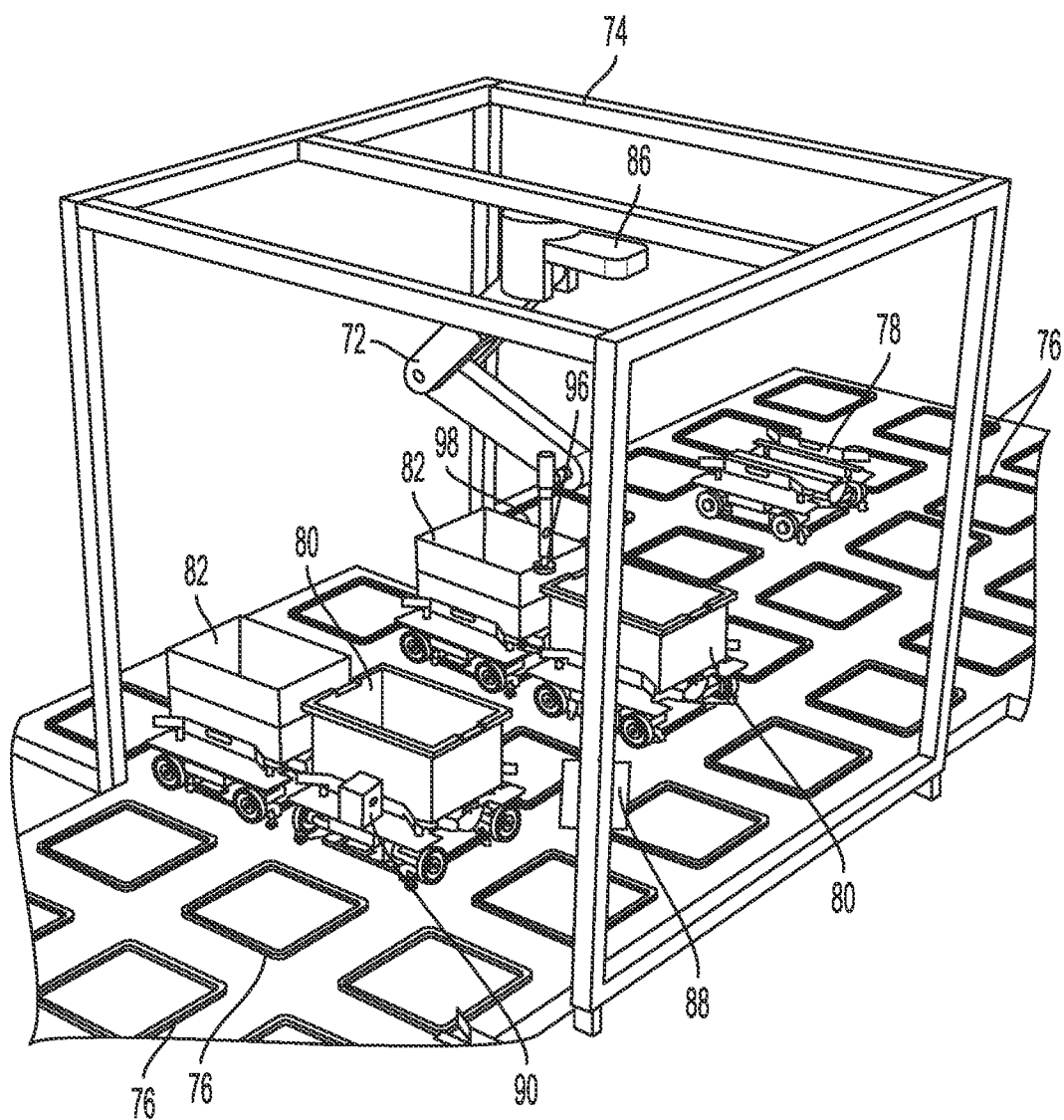
FIG. 8 shows an illustrative diagrammatic enlarged view of a portion of the system of FIG. 7.
Figure 9:
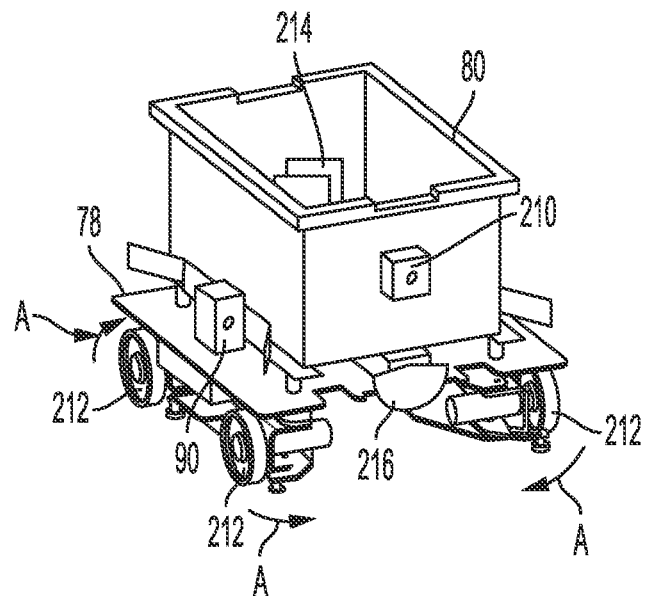
FIG. 9 shows an illustrative diagrammatic view of a mobile carrier device in the system of FIG. 7.
Figure 10:
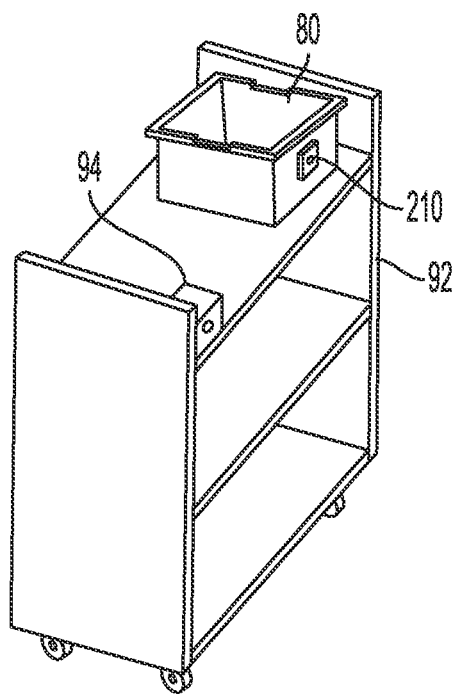
FIG. 10 shows an illustrative diagrammatic view of containers on a shelving system in the system of FIG. 7.

With reference to FIG. 8, the articulated arm 72 includes an end-effector 96 with a fiducial 98 mounted on or near the end-effector 96. In accordance with various aspects of the invention, any of the cameras 86, 88, 90, and 94 may be calibrated by viewing the fiducial as the articulated arm moves. The automated carriers 78 may therefore be re-calibrated as they approach the processing station frame 74. Additionally, and with reference to FIG. 9, each supply bin 80 (or destination bin) may further include a camera 210 that may be calibrated to the articulated arm during processing. The supply bin 80 may contain objects 214, and the automated carrier 78 may include one or two opposing rotatable paddles 216 for securing the bin onto the carrier 78. The pivoting of the wheel assemblies 212 discussed above is shown diagrammatically at A in FIG. 9. Additionally and with reference to FIG. 10, the camera 94 on the non-automated movable carrier 92 may be calibrated to the articulated arm (as well as a bin 80 using the camera 210).

The system may therefore use a fiducial to calibrate the articulated arm with the extrinsic parameters of any of a wide variety of cameras, some on moving and even non-automated carriers, permitting continuous calibration and re-calibration during the processing of objects by the object processing system. The automated carriers may therefore confirm calibration or re-calibrate with an articulated arm during processing. Additionally, a human worker may move a non-automated carrier (e.g., shelving unit 92) into an area proximate the articulated arm 72. Once any of the camera 94 and/or the camera 210 is calibrated with the articulated arm as discussed above, the articulated arm may be used to retrieve objects from the bin 80 on the unit 92.

Figure 11:
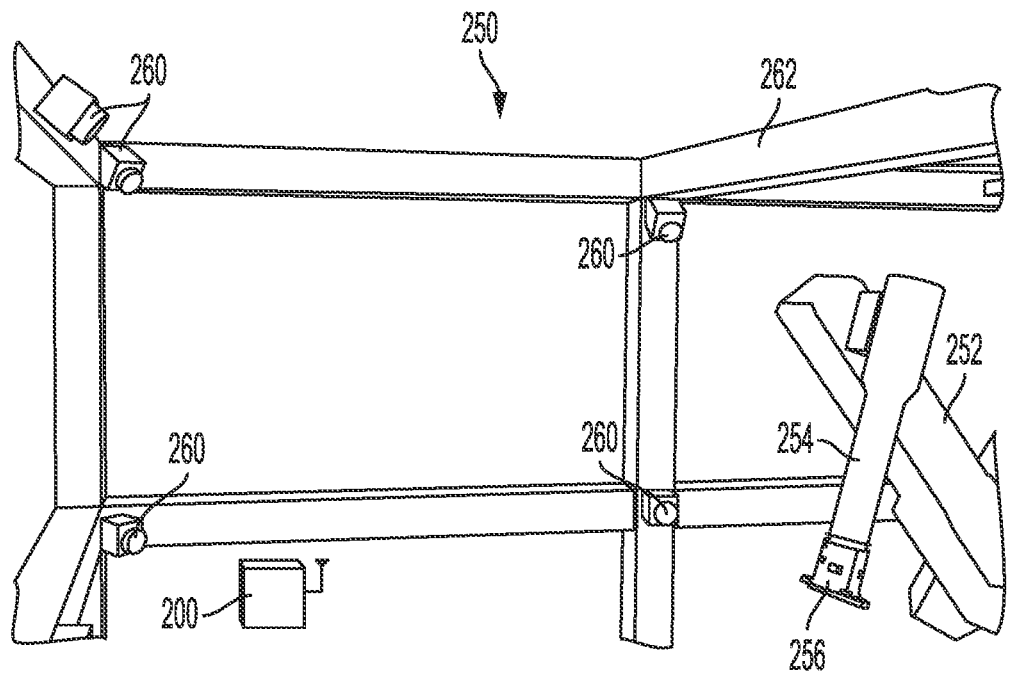
FIG. 11 shows an illustrative diagrammatic view of an object processing station including detection units and a programmable motion device that includes an attached calibration unit in accordance with another aspect of the present invention.
Figure 12:
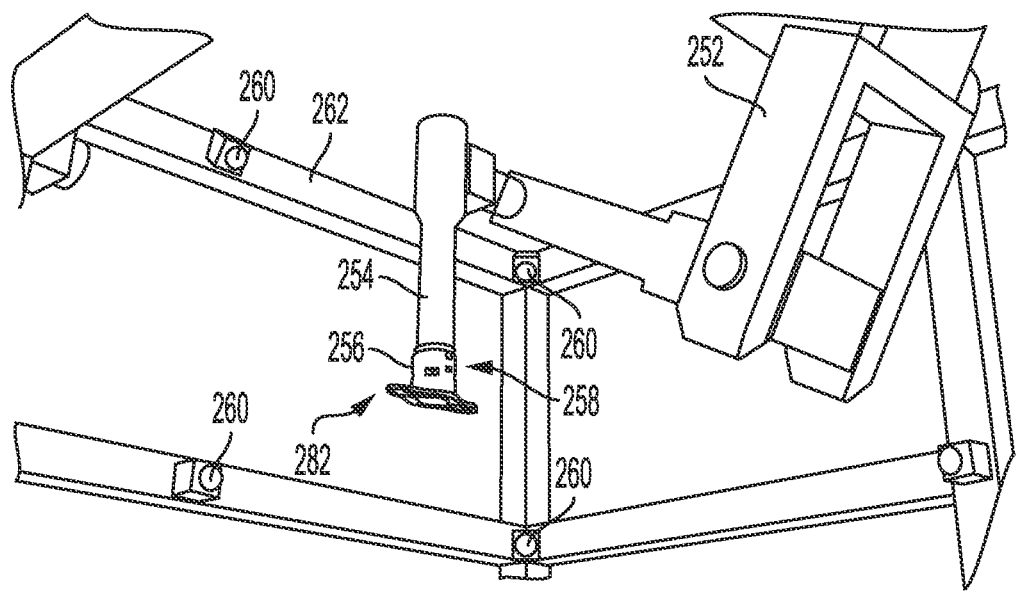
FIG. 12 shows an illustrative diagrammatic underside rear view of the station of FIG. 11 including the attached calibration unit.

FIG. 11 shows at 250 a processing station that includes a programmable motion device 252 with an end-effector 254. The end-effector 254 includes (in place of, for example a vacuum cup), a calibration unit 256. The calibration unit 256 includes one or more features that may be detected by any or all of the detection units 260. FIG. 12 shows a rear underside view of the calibration unit 256 as attached to the end-effector 254 of the programmable motion device 252. The calibration unit 256 includes a coupling portion 258 for coupling to an end-effector coupling portion 280 of the end-effector 254 (shown in FIG. 15), as well as a transverse portion 282 that extends transverse to the coupling portion 258.

Figure 13:
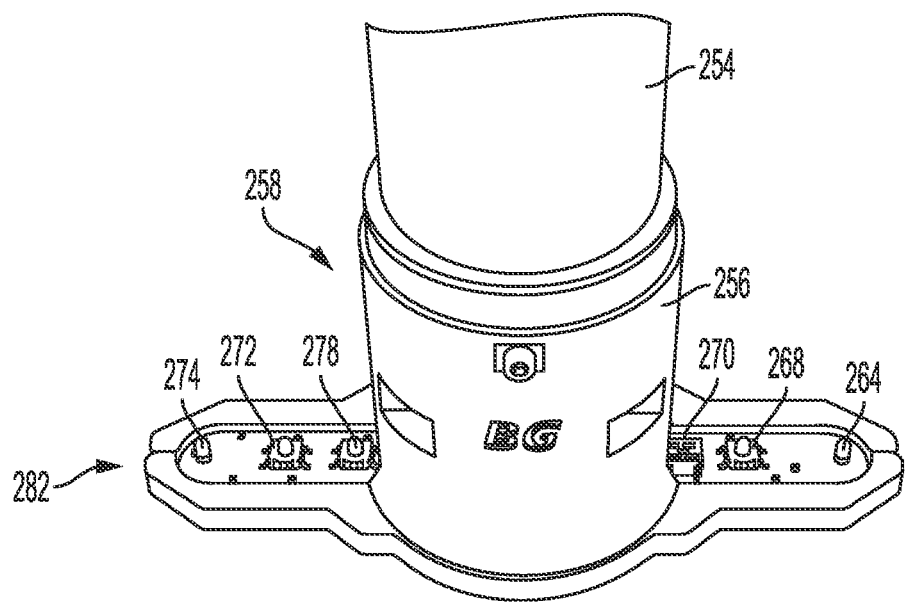
FIG. 13 shows an illustrative diagrammatic top isometric view of the calibration unit of FIG. 11.
Figure 14:
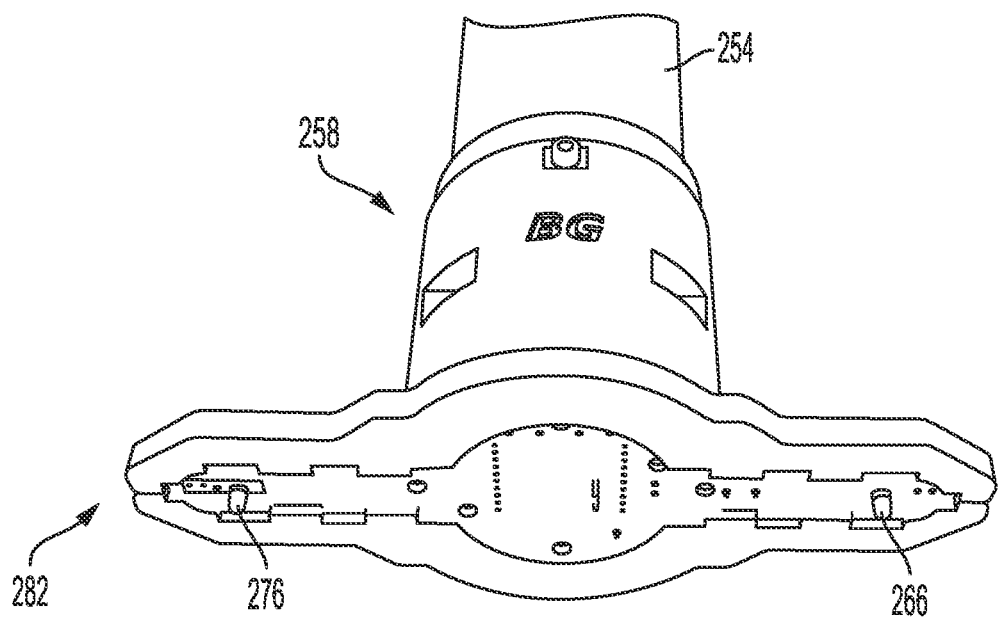
FIG. 14 shows an illustrative diagrammatic bottom isometric view of the calibration unit of FIG. 11.

With reference to FIG. 13, the transverse portion 282 includes on a top side thereof, a visible LED 264 as well as control circuitry 268, 270 for controlling the visible LED and providing wireless communication. The transverse portion 282 may also include an underside (as shown in FIG. 14) that also includes a visible LED 266. The control circuitry 268, 270 may, for example, provide timing control to cause each of the visible LEDs 264, 266 to turn on and off in accordance with a timing signal (e.g., flash) at a rate that is synchronized with a processing system for processing information detected by the detection units 260. This way, illumination from either or both visible LEDs 264, 266 may be readily distinguished from any background illumination by the processing system (e.g., 100, 200). The control circuitry 268, 270 may also provide wireless communication (e.g., infrared, Bluetooth, radio frequency etc.) with the processing system 100, 200.

Figure 15:
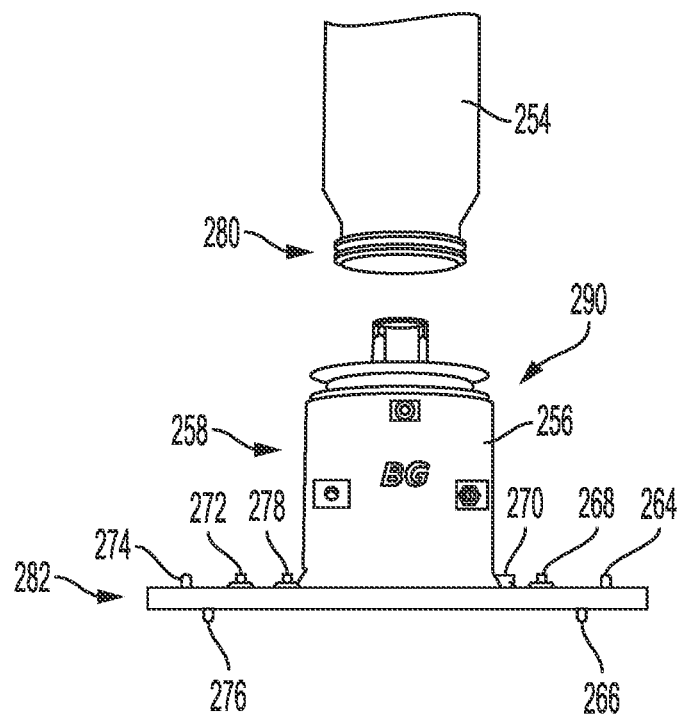
FIG. 15 shows an illustrative diagrammatic side view of the coupling mechanism for coupling the calibration unit and the end-effector of FIG. 11.

The transverse portion 282 also includes on a top side thereof, an infrared LED 274 as well as control circuitry 272, 278 for controlling the infrared LED, at for example, any of a plurality of infrared frequencies and providing wireless communication. The transverse portion 282 may also include on the underside (as shown in FIG. 14) an infrared LED 276. The control circuitry 270, 278 may, for example, provide timing control to cause each of the infrared LEDs 274, 276 to turn on and off in accordance with a timing signal (e.g., flash) at a rate that is synchronized with a processing system for processing information detected by the detection units 260. This way, infrared illumination from either or both infrared LEDs 274, 276 may be readily distinguished from any background infrared illumination by the processing system (e.g., 100, 200). The control circuitry 272, 278 may also provide wireless communication (e.g., infrared, Bluetooth, radio frequency etc.) with the processing system. FIG. 15 shows a side view of the calibration unit 256, also showing a connection portion 280 of the e end-effector 254 for coupling to the calibration unit 256.

Figure 16:
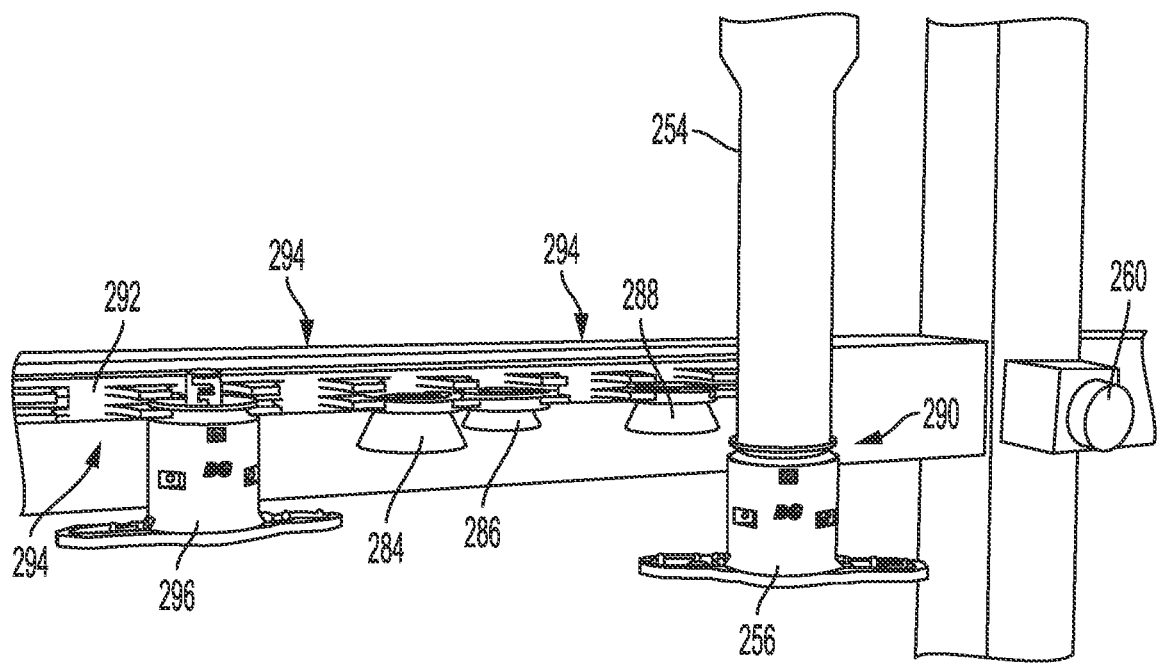
FIG. 16 shows an illustrative diagrammatic view of a calibration exchanging station in the system of FIG. 11, including an storage rack for holding the calibration unit as well as a plurality of vacuum cups for which the calibration unit may be swapped by the programmable motion device.

With further reference to FIG. 16, the coupling portion 258 of the calibration unit 256 may include a rack attachment section 290 for attaching to a rack assembly 292 that includes ports 294 for receiving any of calibration unit(s) 296 or vacuum cups 284, 286, 288, any of which may be coupled to an end-effector (under control of the programmable motion device) via any of magnetic coupling, friction fit coupling, snap fit coupling etc. In this way, during initial set-up as well as during processing, the programmable motion device may move to the rack 292 a vacuum cup currently being used (if any), and in place of the vacuum cup, may attach a calibration unit, permitting the system to calibrate or re-calibrate any of the detection units 260 using the calibration process as discussed above with reference to FIGS. 6A and 6B under control of one or more computer processing systems 100, 200. The calibration unit therefore provides both visible and infrared LEDs that are visible to structured illumination detection units (e.g., cameras), and provides the LEDs on both the top and bottom surfaces of the transverse portion (282) so that the fiducials may be used to calibrate detection units when the LEDs are pointing up and/or down. The control circuitry 268, 270, 272, 278 provide, for example, the structured illumination (intermittent), and provide, for example, radio frequency control of the LEDs as well as other communication to and from the calibration unit. This avoids having the calibration unit controls pass through the control system of the programmable motion device.

The novel technique described herein can take a variety of different materializations with respect to the fiducial on an articulated arm, to accomplish the goal of camera calibration. Those skilled in the art will appreciate that numerous modifications and variations may be made to the above disclosed embodiments without departing from the spirit and scope of the present invention.

What is claimed is:

1. A system for providing extrinsic calibration of a camera to a relative working environment of a programmable motion device that includes an end-effector, said system comprising:
   a calibration unit attached to the end effector, the calibration unit including a plurality of fiducials;
   at least one camera for viewing a fiducial among the plurality of fiducials of the calibration unit as the programmable motion device moves in at least three degrees of freedom, and for capturing a plurality of images containing the fiducial; and
   a calibration processing system for analyzing the plurality of images to determine a fiducial location of the fiducial with respect to the at least one camera to permit calibration of the at least one camera with the programmable motion device,
   the calibration unit including a coupling portion for coupling to the end-effector and a transverse portion that is transverse to the coupling portion, wherein the plurality of fiducials are positioned on mutually opposing sides of the transverse portion of the calibration unit, the plurality of fiducials including a light emitting diode (LED) on a top side or a bottom side of the transverse portion, wherein the transverse portion of the calibration unit further includes control circuitry for controlling the LED.

2. The system as claimed in claim 1, wherein the LED provides intermittent visible illumination.

3. The system as claimed in claim 1, wherein the LED provides intermittent infra-red illumination.

4. The system as claimed in claim 1, wherein the plurality of fiducials further includes a retroreflective fiducial.

5. The system as claimed in claim 4, wherein the retroreflective fiducial is at least partially spherically shaped.

6. The system as claimed in claim 1, wherein the calibration system constructs a matrix for each of the plurality of images of the fiducial.

7. The system as claimed in claim 6, wherein the calibration system concatenates extrinsic parameters of the camera to the programmable motion device.

8. The system as claimed in claim 7, wherein the calibration system employs non-linear least square optimization.

9. The system as claimed in claim 1, wherein the at least one camera is positioned on an automated carrier.

10. The system as claimed in claim 1, wherein the at least one camera is positioned on a non-automated carrier.

11. The system as claimed in claim 1, wherein the at least one camera is positioned on a bin.

12. The system as claimed in claim 1, wherein the plurality of fiducials includes a first pair of light emitting diodes (LEDs) that are positioned on mutually opposing sides of the transverse portion and a second pair of LEDs that are positioned on mutually opposing sides of the transverse portion, wherein the first pair of LEDs and the second pair of LEDs are further positioned on mutually opposing sides of the end-effector, the first pair of LEDs being visible LEDs and the second pair of LEDs being infra-red LEDs, wherein the control circuitry included in the transverse portion of the calibration unit is configured to control the first pair of LEDs and the second pair of LEDs.

13. A method for providing extrinsic calibration of a camera to a relative working environment of a programmable motion device that includes an end-effector, said method comprising:
viewing with the camera a fiducial among a plurality of fiducials located on a calibration unit attached to the end-effector;
capturing a plurality of images containing the fiducial using the camera as the programmable motion device moves in at least three degrees of freedom; and
analyzing the plurality of images to determine a fiducial location with respect to the camera to permit calibration of the camera with the programmable motion device,
wherein the calibration unit includes a coupling portion for coupling to the end-effector and a transverse portion that is transverse to the coupling portion, wherein the plurality of fiducials are positioned on mutually opposing sides of the transverse portion of the calibration unit, the plurality of fiducials including a light emitting diode (LED) on a top side or a bottom side of the transverse portion, wherein the transverse portion further includes control circuitry for controlling the LED.

14. The method as claimed in claim 13, wherein method includes providing intermittent visible illumination with the LED.

15. The method as claimed in claim 13, wherein method includes providing intermittent infra-red illumination with the LED.

16. The method as claimed in claim 13, wherein the plurality of fiducials further includes a retroreflective fiducial.

17. The method as claimed in claim 16, wherein the retroreflective fiducial is at least partially spherically shaped.

18. The method as claimed in claim 13, wherein analyzing the plurality of images includes constructing a matrix for each of the plurality of images of the fiducial.

19. The method as claimed in claim 18, wherein analyzing the plurality of images includes concatenating extrinsic parameters of the camera to the programmable motion device.

20. The method as claimed in claim 19, wherein analyzing the plurality of images includes employing non-linear least square optimization.

21. The method as claimed in claim 13, wherein the camera is positioned on an automated carrier.

22. The method as claimed in claim 13, wherein the camera is positioned on a non-automated carrier.

23. The method as claimed in claim 13, wherein the camera is positioned on a bin.

24. The method as claimed in claim 13, wherein viewing with the camera the fiducial as the programmable motion device moves in at least three degrees of freedom, capturing the plurality of images containing the fiducial, and analyzing the plurality of images to determine the fiducial location all occur during the processing of objects with the programmable motion device.

25. A method for providing extrinsic calibration of a camera to a relative working environment of a programmable motion device that includes an end-effector, said method comprising:
capturing a plurality of images containing a fiducial among a plurality of fiducials located on a calibration unit attached to the end-effector while the programmable motion device moves in at least three degrees of freedom; and
analyzing the plurality of images to determine a fiducial location with respect to the camera to permit calibration of the camera with the programmable motion device,
wherein the calibration unit including a coupling portion for coupling to the end-effector and a transverse portion that is transverse to the coupling portion, and
wherein the plurality of fiducials includes a first pair of light emitting diodes (LEDs) that are positioned on mutually opposing sides of the transverse portion of the calibration unit and a second pair of LEDs that are positioned on mutually opposing sides of the transverse portion, wherein the first pair of LEDs and the second pair of LEDs are further positioned on mutually opposing sides of the end-effector, the first pair of LEDs being visible LEDs and the second pair of LEDs being infra-red LEDs, wherein the transverse portion of the calibration unit further includes control circuitry for controlling the first pair of LEDs and the second pair of LEDs.

26. The method as claimed in claim 25, wherein analyzing the plurality of images includes constructing a matrix for each of the plurality of images of the fiducial.

27. The method as claimed in claim 26, wherein analyzing the plurality of images includes concatenating extrinsic parameters of the camera to the programmable motion device.

28. The method as claimed in claim 27, wherein analyzing the plurality of images includes employing non-linear least square optimization.

\* \* \* \* \*

UNITED STATES PATENT AND TRADEMARK OFFICE
CERTIFICATE OF CORRECTION

PATENT NO. : 11,826,918 B2
APPLICATION NO. : 17/167648
DATED : November 28, 2023
INVENTOR(S) : Yu Ding et al.

Page 1 of 1

It is certified that error appears in the above-identified patent and that said Letters Patent is hereby corrected as shown below:

In the Specification

In Column 3, Line 22, should read:
"including a storage rack for holding the calibration unit as"

In Column 4, Line 31, should read:
"position and orientation of the end-effector in space)."

In Column 5, Line 35, should read:
"108), and the process then involves constructing a matrix)"

In Column 6, Line 59, should read:
"that a human worker may move near to the programmable"

In Column 7, Line 57, should read:
"(e.g., infrared, Bluetooth, radio frequency, etc.) with the"

In Column 8, Line 8, should read:
"infrared, Bluetooth, radio frequency, etc.) with the process-"

In Column 8, Line 10, should read:
"256, also showing a connection portion 280 of the end-"

In the Claims

In Claim 12, Column 9, Line 32, should read:
"plurality of fiducials including the LED includes a first pair of light emitting"

Signed and Sealed this
Twenty-seventh Day of August, 2024

Katherine Kelly Vidal
*Director of the United States Patent and Trademark Office*